United States Patent Office 3,529,019
ALKYLARYLOXY ALANINES
John T. Suh, Mequon, and Joseph A. Skorcz, Milwaukee, Wis., assignors to Colgate-Palmolive Company, New York, N.Y., a corporation of Delaware
No Drawing. Filed Apr. 23, 1968, Ser. No. 723,605
Int. Cl. C07c 101/72
U.S. Cl. 260—519                                      6 Claims

ABSTRACT OF THE DISCLOSURE

The compounds are 2-alkyl-3-aryloxyalanines useful as chelating agents for heavy metal ions and as pharmaceutical agents such as central nervous system stimulants. Compounds disclosed are 2-methyl-3-(2-methoxyphenoxy)-alanine and 2-methyl-3-(2-methoxy-4-chlorophenoxy)-alanine.

SUMMARY OF THE INVENTION

The present invention relates to novel amino acids of the formula

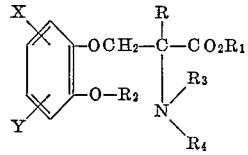

in which X and Y are hydrogen, a halogen such as fluoro or chloro, trifluoromethyl, hydroxy or benzyloxy, R is hydrogen, a lower alkyl of 1 to 4 carbon atoms, phenyl, a cycloalkyl of 3 to 7 carbon atoms, a cycloalkyl-lower alkyl in which the cycloalkyl contains 3 to 7 carbon atoms or a phenyl-lower alkyl of 7 to 13 carbon atoms, $R_1$ is hydrogen or lower alkyl, $R_2$ is lower alkyl of 1 to 4 carbon atoms and $R_3$ and $R_4$ are selected from hydrogen, a lower alkyl of 1 to 4 carbon atoms, a cycloalkyl of 3 to 7 carbon atoms such as cyclopropyl or cyclopentyl, a cycloalkyl-lower alkyl in which the cycloalkyl contains 3 to 7 carbon atoms such as cyclohexyl-methyl or cyclopentyl-ethyl or a phenyl-lower alkyl of 7 to 13 carbon atoms such as benzyl, phenethyl or phenylisopropyl.

The compounds of the present invention are preferably prepared by reacting a compound of the formula

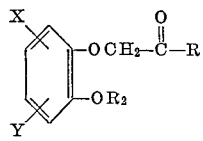

in which X, Y, R and $R_2$ are as previously defined, with amonium carbonate and potassium cyanide in 50% aqueous ethanol under reflux conditions to form a 5-alkyl-5-(2 - alkoxyphenoxy)methylhydantoin. The thus formed hydantoin is then reacted with barium hydroxide octahydrate in water at reflux for about 70 hours to form the 2-alkyl-3-(2-alkoxyphenoxy)-alanine. If desired, the methyl ester of the amino acid may be readily prepared by treating the amino acid with thionyl chloride in methanol. The corresponding ethyl ester may be prepared by treating the acid with ethanol and hydrochloric acid.

The described process may be illustrated as follows:

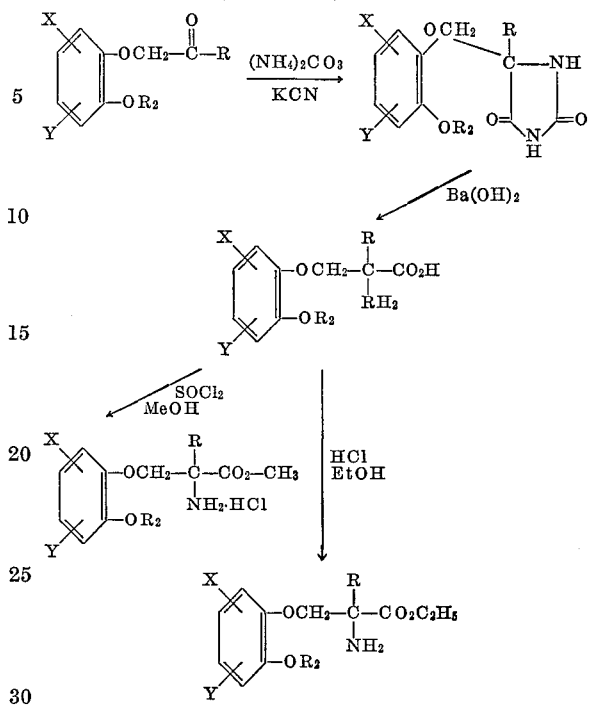

wherein X, Y, R and $R_2$ are as previously described.

The compounds in which X or Y is chloro may be prepared, for example, by treating guaiacol acetate with N-chlorosuccinimide in dimethylformamide to form 5-chloroguaiacol acetate which when treated with sodium hydroxide forms 5-chloroguaiacol. The latter compound when treated with chloroacetone forms 1-(2-methoxy-5-chlorophenoxy)-2-propanone, which can in turn be treated with ammonium carbonate and potassium cyanide to form the corresponding hydantoin, which upon treatment with barium hydroxide octahydrate will yield 2-methyl-3-(2-methoxy-5-chlorophenoxy)-alanine. The described process may be illustrated as follows:

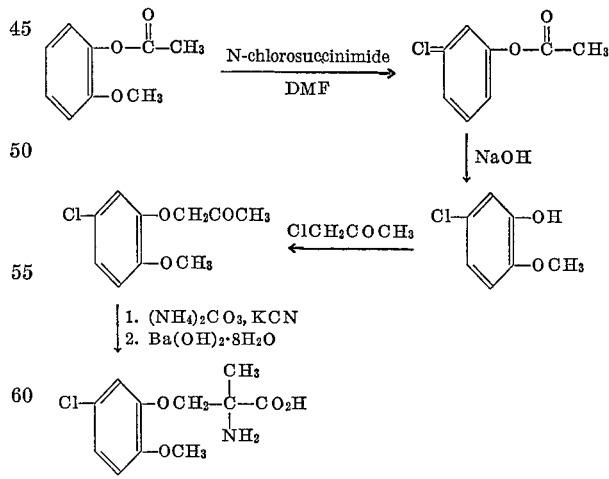

The compounds in which X or Y are fluorine may be prepared by treating an appropriately substituted guaiacol such as 5-fluoroguaiacol, a known compound, prepared as described by J. Corse and T. T. Ingraham, J. Org. Chem., 16, 1345 (1951), with chloroacetone, followed by treatment first with ammonium carbonate-potassium cyanide and then with barium hydroxide octahydrate to form 2 - methyl-3-(2-methoxy-5-fluorophenoxy)-alanine. The described process may be illustrated as follows:

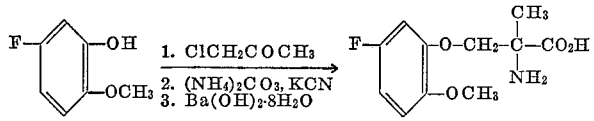

The compounds in which X or Y are benzyloxy or hydroxy may be prepared by first treating a guaiacol, such as 4-benzyloxy-guaiacol, with chloroacetone, treating the resulting compound with ammonium carbonate and potassium cyanide to form the corresponding hydantoin, which upon treatment with barium hydroxide octahydrate yields the compound in which X is benzyloxy. The benzyloxy derivative may then be hydrogenated to form the hydroxy derivative. The process may be illustrated as follows:

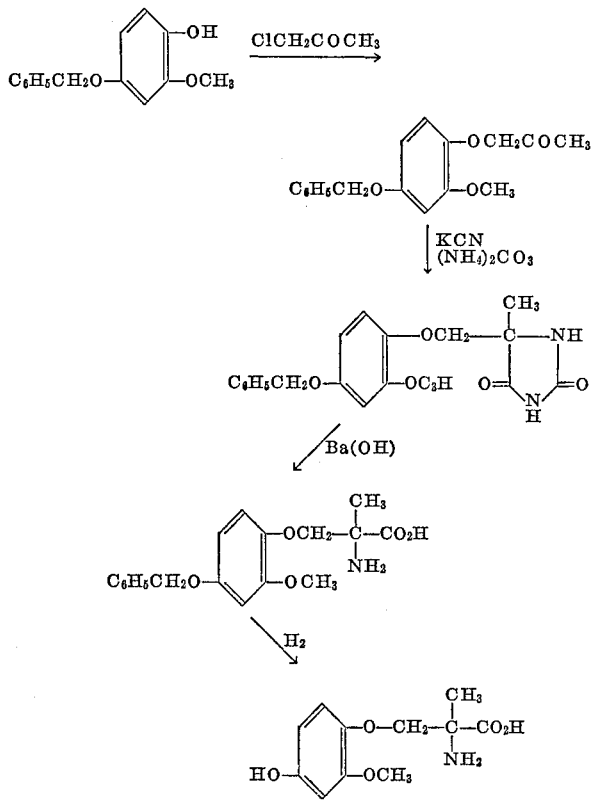

The compounds in which $R_3$ and $R_4$ are other than hydrogen may be prepared by conventional means. For example, the compounds in which $R_3$ and $R_4$ are both methyl may be prepared by treating a suitable primary amine with formic acid and formaldehyde. Amines in which $R_3$ is benzyl may be prepared by treating the primary amine with benzaldehyde and then treating the resulting product with sodium borohydride or hydrogen in the presence of a suitable catalyst such as Raney nickel to form the corresponding benzylamino derivative. The monomethyl amino compound may be prepared by treating the benzylamino derivative with formic acid and formaldehyde to form the methyl benzylamino derivative which can be catalytically cleaved to form the monomethyl derivative.

The compounds in which $R_3$ is cycloalkyl may be prepared by treating a corresponding primary amine with a suitable ketone such as cyclohexanone in the presence of hydrogen in ethanol to form the corresponding amine.

Representative of the compounds which may be prepared by practice of the present invention are:

5-methyl-5-(2-methoxyphenoxy)methylhydantoin,
5-methyl-5-(2-methoxy-4-chlorophenoxy)methylhydantoin,
5-methyl-5-(2-methoxy-5-chlorophenoxy)methylhydantoin,
5-methyl-5-(2-methoxy-5-fluorophenoxy)methylhydantoin,
2-methyl-3-(2-methoxyphenoxy)-alanine,
3-(2-ethoxyphenoxy)-alanine,
2-methyl-3-(2-methoxy-4-chlorophenoxy)-alanine,
2-methyl-3-(2-methoxyphenoxy)-alanine methyl ester hydrochloride,
2-methyl-3-(2-methoxy-4-chlorophenoxy)-alanine methyl ester,
2-methyl-3-(2-methoxy-5-chlorophenoxy)-alanine,
2-methyl-3-(2-methoxy-5-fluorophenoxy)-alanine,
N,N-dimethyl-2-benzyl-3-(2-methoxyphenoxy)-alanine,
2-cyclopropyl-3-(2-ethoxy-4-chlorophenoxy)-alanine ethyl ester, and
2-methyl-3-(2-methoxyphenoxy)-alanine ethyl ester.

Pharmaceutically acceptable salts of the compounds of the present invention capable of forming such salts may be prepared by reacting the amino acid in a suitable mutual solvent with an acid such as formic acid, citric acid, maleic acid, sulfuric acid, hydrochloric acid, succinic acid, tartaric acid, benzoic acid and fumaric acid.

The compounds of the present invention may be employed as chelating agents to inactivate heavy metal ions, especially ferric, in those chemical processes in which it is desirable to inactivate such ions. The compounds are readily soluble in warm water and can simply be added to the solution containing the undesired ions.

The compounds are also pharmacologically active as central nervous system stimulants and antihypertensive agents. For example, the compounds 2-methyl-3-(2-methoxyphenoxy)-alanine and 2-methyl-3-(4-chlorophenoxy)-alanine which are representative of the compounds, produce a central nervous system stimulation and a behavioral profile in mice receiving 100 to 3,000 mg./kg. intraperitoneally resembling the effects produced with the known antidepressant agent desipramine. The compounds were found to have an $LD_{50}$ in mice greater than 750 mg./kg. in the behavioral studies which were patterned after those described by S. Irwin in "Animal and Clinical Pharmacologic Techniques in Drug Evaluation," J. H. Nodine and P. E. Siegler, ed., Yearbook Medical Publishers, Inc., Chicago, Ill. (1964), pp. 36–54. In the standard vagotomized, sodium pentobarbitol anesthetized dog preparation the forementioned 2-methyl-3-(2-methoxyphenoxy)-alanine and its methyl and ethyl esters in intravenous doses of 3 mg./kg. and 10 mg./kg. decreased the blood pressure of the animal from about 140 mm. to about 90 mm. and maintained it at that depressed level for up to 1½ hours.

When employed as pharmaceutical agents the novel amino acids are preferably combined with pharmaceutical diluents and formed into dosage forms suitable for administration such as tablets, capsules, solutions and the like. The oral route of administration is preferred, but the compounds may be administered parenterally, if desired. Suitable pharmaceutical carriers such as starch, sugars and talc can be employed to form powders which can in turn be tableted or used to fill gelatin capsules. Suitable lubricants such as magnesium stearate, binders such as gelatin, flavoring agents and disintegrating agents may also be employed to provide a more acceptable dosage form.

The tablets or capsules may contain any suitable amount of one or more of the active ingredients. Such dosage forms, however, should generally contain 150 to 500 mg. of the active ingredient.

The amount of medication which an individual will receive per day will depend upon the active compound selected for administration and the patient's condition. Generally speaking, the daily dose to produce central nervous system stimulation in an average weight adult will range from about 500 mg. per day to as much as 2 or 3 grams per day.

The following examples illustrate the practice of the invention:

EXAMPLE 1 o-Methoxyphenoxyacetone o-Methoxyphenoxyacetone is prepared by the procedure of Hurd and Perletz, J. Am. Chem. Soc., 68, 38 (1946). A mixture of chloroacetone (471 g., 5 moles) and 10 g. of KI in 1 liter of acetone is refluxed for 2 hours and then added portionwise, along with 352 g. (2.55 moles) of $K_2CO_3$, to a stirred mixture of guaiacol (422 g., 3.4 moles) and $K_2CO_3$ (117.5 g., 0.85 mole) in 2 liters of acetone. After refluxing for 16 hours, the solids are filtered, the filtrate evaporated, and the residue distilled. The product is isolated as a viscous, straw-colored liquid, B.P. 93–97° (0.1 mm.), which solidifies to a low melting material on standing.

EXAMPLE 2

5-methyl-5-(2-methoxyphenoxy)methylhydantoin

A solution of 23.4 g. (0.13 mole) of o-methoxyphenoxyacetone, 133.5 g. (1.17 moles) of ammonium carbonate and 12.7 g. (0.195 mole) of potassium cyanide in 600 ml. of 50 percent aqueous ethanol is refluxed for 24 hours. The solvent is distilled until solids begin to precipitate; then the mixture is cooled and acidified to pH 2 with concentrated HCl. After stirring for 15 minutes, the product is filtered and dried to yield white granules, M.P. 136–138.5°. An analytical sample from aqueous ethanol melts at 138.5–140°.

*Analysis.*—Calc'd for $C_{12}H_{14}N_2O_4$ (percent): C, 57.59; H, 5.64; N, 11.20. Found (percent): C. 57.70; H, 5.76; N, 10.98.

EXAMPLE 3

2-methyl-3-(2-methoxyphenoxy)-alanine

A mixture of 11.25 g. (0.045 mole) of the hydantoin of Example 2 and 59.9 g. (0.19 mole) of barium hydroxide octahydrate in 400 ml. of water is refluxed for 70 hours, cooled to room temperature, and filtered. The solids thereby isolated are washed with water which is combined with the original filtrate and acidified to pH 2 with concentrated HCl. The resulting precipitate is filtered and washed with water which is combined with the filtrate and neutralized with 6 N NaOH. Water then is removed by distillation until solids begin to separate from solution. The mixture is cooled, and the precipitate is filtered and dried as a cream-colored solid. Recrystallization from aqueous acetone provides 2 - methyl - 3 - (2 - methoxyphenoxy)-alanine in the form of a white powder, M.P. 250–252°.

*Analysis.*—Calc'd for $C_{11}H_{13}NO_4$ (percent): C, 58.65; H, 6.71; N, 6.22. Found (percent): C, 58.76; H, 6.97; N, 6.12.

EXAMPLE 4

2-methyl-3-(2-methoxyphenoxy)-alanine methyl ester hydrochloride

To a solution of thionyl chloride (1.9 g., 0.0156 mole) in 40 ml. of MeOH cooled to −10° is added portionwise 2.7 g. (0.012 mole) of the amino acid of Example 3. This solution is refluxed for 2 hours, concentrated under vacuum, poured into 200 ml. of dry ether, and refrigerated. Two recrystallizations of the resulting semi-solid from isopropanol-ether affords 2-methyl-3-(2-methoxyphenoxy)-alanine methyl ester hydrochloride in the form of a white crystalline powder, M.P. 120–124°.

*Analysis.*—Calc'd for $C_{12}H_{17}NO_3 \cdot HCl \cdot H_2O$ (percent): C, 49.05; H, 6.87; N, 4.76. Found (percent): C, 48.65; H, 6.94; N, 5.14.

EXAMPLE 5

2-methyl-3-(2-methoxyphenoxy)-alanine ethyl ester

A solution of 4.5 g. (0.02 mole) of the amino acid of Example 3 in 40 ml. of absolute ethanol saturated with dry HCL is refluxed for 4 hours, then evaporated to dryness. Benzene (50 ml.) is added and evaporated under vacuum. The residue is treated with 25 ml. of cold, ammonia-saturated ethanol, followed by 400 ml. of dry ether, and refrigerated. Filtration of the deposited $NH_4Cl$ and evaporation of the filtrate provides the 2-methyl-3-(2-methoxyphenoxy)-alanine ethyl ester as a pale yellow oil which distills at 115° (0.1 mm.).

*Analysis.*—Calc'd for $C_{13}H_{19}NO_2$ (percent): C, 61.64; H, 7.56; N, 5.76. Found (percent): C, 61.59; H, 7.42; N, 5.56.

EXAMPLE 6

4-chloroguaiacol

A solution of guaiacol (62 g., 0.5 mole) and 67.8 g. (0.5 mole) of N-chlorosuccinimide in 400 ml. of dimethylformamide is heated at 90° for 40 hours, cooled, diluted with 3 liters of water, and extracted with ether. The ether is washed with water, dried, and evaporated to give an amber liquid which is distilled to afford 4-chloroguaiacol, B.P. 130–135° (15 mm.).

*Analysis.*—Calc'd for $C_7H_7ClO_2$ (percent): C, 53.01; H, 4.45; Cl, 22.36. Found (percent): C, 53.34; H, 4.25; Cl, 22.46.

EXAMPLE 7

1-(2-methoxy-4-chlorophenoxy)-2-propanone 4 chloroguaiacol (68.2 g., 0.43 mole) and chloroacetone (60.1 g., 0.65 mole) are reacted as described in Example 1. The product 1-(2-methoxy-4-chlorophenoxy)-2-propanone is obtained as a colorless liquid which distills at 122–125° (0.3 mm.).

*Analysis.*—Calc'd for $C_{10}H_{11}ClO_3$ (percent): C, 55.95; H, 5.15; Cl, 16.51. Found (percent): C, 56.11; H, 5.37; Cl, 16.26.

EXAMPLE 8

5-methyl-5-(2-methoxy-4-chlorophenoxy) methylhydantoin

1 - (2 - methoxy - 4 - chlorophenoxy) - 2 - propanone 27.8 g. (0.13 mole), 74.9 g. (0.78 mole) of ammonium carbonate, and 13.0 g. (0.2 mole) of KCN in 800 ml. of 50% aqueous ethanol are reacted as described in Example 2. The 5 - methyl - 5-(2-methoxy - 4 - chlorophenoxy) methylhydantoin in the form of pale cream-colored powder melts at 157.5–159° after recrystallization from chloroform-petroleum ether.

*Analysis.*—Calc'd for $C_{12}H_{13}ClN_2O_4$ (percent): C, 50.62; H, 4.60; Cl, 12.45; N, 9.84. Found (percent): C, 50.73; H, 4.69; Cl, 13.21; N, 9.81.

EXAMPLE 9

2-methyl-3-(2-methoxy-4-chlorophenoxy)-alanine 5-methyl-5-(2-methoxy - 4 - chlorophenoxy)methylhydantoin 8.6 g. (0.03 mole) and 41 g. (0.13 mole) of barium hydroxide octahydrate are reacted as described in Example 3. In this case, neutralization of the acidic aqueous solution causes the immediate precipitation of the 2-methyl-3-(2-methoxy - 4 - chlorophenoxy)-alanine as a white powder, M.P. 235–236°. A second crop is isolated by concentrating the filtrate. Recrystallization from water provides analytically pure material, M.P. 236–238°.

*Analysis.*—Calcd. for $C_{11}H_{14}ClNO_4$ (percent): C, 50.87; H, 5.44; N, 5.40. Found (percent): C, 50.57; H, 5.69; N, 5.34.

EXAMPLE 10

5-chloroguaiacol

A solution of 5-chloroguaiacol acetate (151.7 g., 0.75 mole) in 750 ml. of 10% aqueous NaOH is refluxed for 20 hrs., cooled, acidified with concentrated HCl and extracted thoroughly with either. Evaporation of the dried (Na$_2$SO$_4$) ether and distillation of the residual oil affords 5-chloroguaiacol, B.P. 135–138° (10 mm.).

EXAMPLE 11

1-(2-methoxy-5-chlorophenoxy)-2-propanone 5-chloroguaiacol (80.7 g., 0.51 mole) and chloroacetone (70.9 g., 0.766 mole) are reacted as described in Example 1. The product is obtained as a viscous liquid, B.P. 115–119° (0.1 mm.) which readily solidifies. Recrystallization from aqueous ethanol gives 1-(2 - methoxy - 5-chlorophenoxy)-2-propanone in the form of white needles, M.P. 62.5–65°.

*Analysis.*—Calcd. for C$_{10}$H$_{11}$ClO$_3$ (percent): C, 55.94; H, 5.17; Cl, 16.52. Found (percent): C, 56.10; H, 5.12; Cl, 16.37.

EXAMPLE 12

2-methyl-3-(2-methoxy-5-chlorophenoxy)-alanine

The ketone (42.8 g.) of Example 11 is treated with ammonium carbonate and potassium cyanide in the manner previously described to form the corresponding hydantoin, M.P. 177–178° after recrystallization from water, which is then treated with barium hydroxide octahydrate to form 2 - methyl-3-(2-methoxy-5-chlorophenoxy)-alanine, M.P. 252–253°.

*Analysis.*—Calcd. for C$_{11}$H$_{14}$ClNO$_4$ (percent): C, 50.87; H, 5.44; N, 5.40. Found (percent): C, 50.63; H, 5.64; N, 5.65.

EXAMPLE 13

5-methyl-5-(2-methoxy-4-nitrophenoxy)methylhydantoin

A solution of 1-(2-methoxy - 4 - nitrophenoxy)-2-propanone (11.8 g., 0.05 mole), (NH$_4$)$_2$CO$_3$ (28.8 g., 0.3 mole) and KCN (3.6 g., 0.055 mole) in 300 ml. of 50% aqueous ethanol is refluxed gently for 6 hrs. and then concentrated under vacuum. The residual solution is diluted with water (100 ml.) and acidified with concentrated HCl. The resulting solid is filtered and pulled nearly dry. Recrystallization from ethanol provides 5-methyl - 5 - (2-methoxy-4-nitrophenoxy)methylhydantoin in the form of a yellow powder, M.P. 183–186°.

*Analysis.*—Calcd. for C$_{12}$H$_{13}$N$_3$O$_6$ (percent): C, 48.81; H, 4.44; N, 14.24. Found (percent): C, 48.84; H, 4.48; N, 14.18.

EXAMPLE 14

5-methyl-5-(2-methoxy-4-aminophenoxy)methylhydantoin hydrochloride

A mixture of the nitro compound of Example 13 (8.9 g., 0.03 mole) and 0.75 g. of 10% palladium on carbon in 150 ml. of ethanol containing 2.5 ml. (0.03 mole) of concentrated HCl is treated with hydrogen at room temperature and an initial pressure of 43.3 hrs. The theoretical uptake is realized in 45 minutes, and the suspension is filtered. Evaporation of the filtrate gives a solid which is recrystallized from methanol-ether to give 5 - methyl-5-(2 - methoxy-4-aminophenoxy)methylhydantoin hydrochloride as an olive-tan powder, M.P. 272–274°.

*Analysis.*—Calcd. for C$_{12}$H$_{16}$ClN$_3$O$_4$ (percent): C, 47.76; H, 5.35; N, 13.93. Found (percent): C, 48.05; H, 5.33; N, 13.86.

EXAMPLE 15

1-(2-methoxy-4-aminophenoxy)-2-propanone hydrochloride

A mixture of 1-(2-methoxy-4-nitrophenoxy) - 2 - propanone (13.5 g., 0.06 mole) and 1 g. of 10% palladium on carbon in 200 ml. of ethanol containing 5 ml. (0.06 mole) of concentrated HCl is treated with hydrogen at room temperature and an initial pressure of 45.8 p.s.i. After 1 hr., the catalyst is removed by filtration and the filtrate is evaporated to dryness. Recrystallization of the residual solid from methanol-ether affords 1-(2-methoxy-4-aminophenoxy)-2-propanone hydrochloride as a light amber powder, M.P. 189–190°.

EXAMPLE 16

1-(2-methoxy-5-fluorophenoxy)-2-propanone 5-fluoroguaiacol, prepared as described by J. Corse and T. T. Ingraham, J. Org. Chem., 16, 1345 (1951) is allowed to react with chloroacetone as described in Example 1. Distillation affords a clear oil, B.P. 90–93° (0.1 mm.).

*Analysis.*—Calcd. for C$_{10}$H$_{11}$FO$_3$ (percent): C, 60.60; H, 5.60. Found (percent): C, 60.42; H, 5.68.

EXAMPLE 17

5-methyl-5-(2-methoxy-5-fluorophenoxy)methylhydantoin

The ketone of Example 16 is treated with ammonium carbonate and potassium cyanide in aqueous ethanol as described in Example 2. The 5-methyl-5-(2-methoxy-5-fluorophenoxy)methylhydantoin was recrystallized from chloroform-petroleum ether to yield a tan powder which melts at 149–152°.

EXAMPLE 18

2-methyl-3-(2-methoxy-5-fluorophenoxy)-alanine

The hydantoin of Example 17 is treated with barium hydroxide to give 2-methyl-3-(2-methoxy-5-fluorophenoxy)-alanine as a white powder, M.P. 258–261°, after recrystallization from water.

*Analysis.*—Calcd. for C$_{11}$H$_{14}$FNO$_4$ (percent): C, 54.31; H, 5.80; N, 6.01. Found (percent): C, 54.10; H, 5.78; N, 5.72.

We claim:

1. A compound selected from the group consisting of compounds and acid addition salts of compounds of the formula

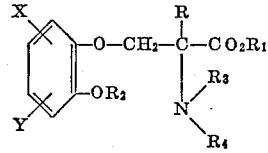

in which X and Y are hydrogen, chloro, bromo, fluoro, trifluoromethyl, hydroxy or benzyloxy, R is hydrogen, lower alkyl, phenyl, cycloalkyl of 3 to 7 carbons, cycloalkyl-lower alkyl in which the cycloalkyl has 3 to 7 carbons or a phenyl-lower alkyl of 7 to 13 carbon atoms, R$_1$ is hydrogen or lower alkyl, R$_2$ is lower alkyl and R$_3$ and R$_4$ are hydrogen, lower alkyl of 1 to 4 carbon atoms, cycloalkyl of 3 to 7 carbons, cycloalkyl-lower alkyl in which the cycloalkyl has 3 to 7 carbons or a phenyl-lower alkyl of 7 to 13 carbon atoms.

2. A compound of claim 1 in which X and Y are hydrogen or chloro.

3. A compound of claim 1 in which R$_1$ is hydrogen.

4. A compound of claim 1 in which R$_3$ and R$_4$ are hydrogen.

5. A compound of claim 1 in which R$_2$ is methyl.

6. A compound of claim 1 in which X, Y and R$_1$ are hydrogen and R and R$_2$ are methyl.

References Cited

UNITED STATES PATENTS 3,402,198   9/1968   Bolhofer _____ 260—519

LORRAINE A. WEINBERGER, Primary Examiner

L. A. THAXTON, Assistant Examiner

U.S. Cl. X.R.

260—239.3, 471, 590, 600, 501.11; 424—309, 319

UNITED STATES PATENT OFFICE
CERTIFICATE OF CORRECTION

Patent No. 3,529,019          Dated September 30, 1970

Inventor(s) John T. Suh and Joseph A. Skorcz

It is certified that error appears in the above-identified patent and that said Letters Patent are hereby corrected as shown below:

Column 2, line 10-15 -

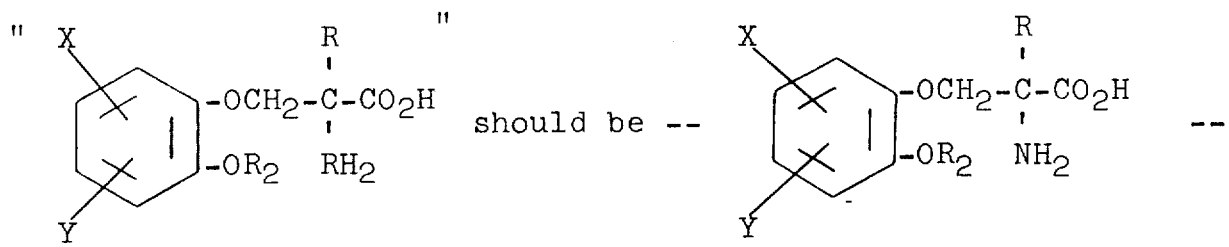

Column 2, lines 45-50, second formula

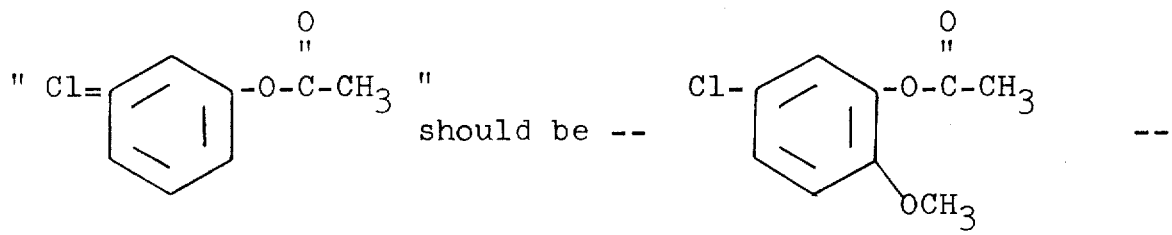

Column 3, lines 35-40 -

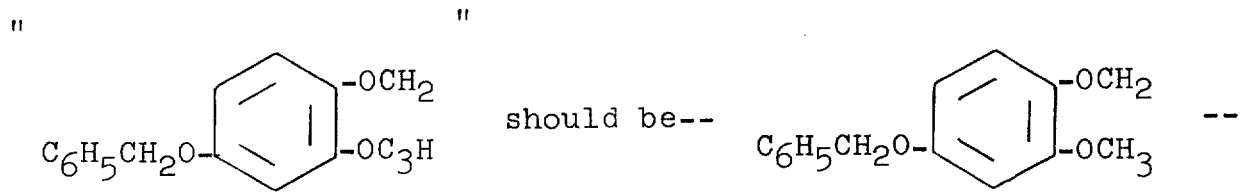

Signed and sealed this 1st day of December 1970.

(SEAL)
Attest:

Edward M. Fletcher, Jr.
Attesting Officer

WILLIAM E. SCHUYLER, JR.
Commissioner of Patents